April 8, 1958   J. JANHSEN   2,830,175
ANTI-DAZZLE ARRANGEMENT FOR HEADLIGHTS OF
MOTOR VEHICLES
Filed Jan. 11, 1956   2 Sheets-Sheet 1
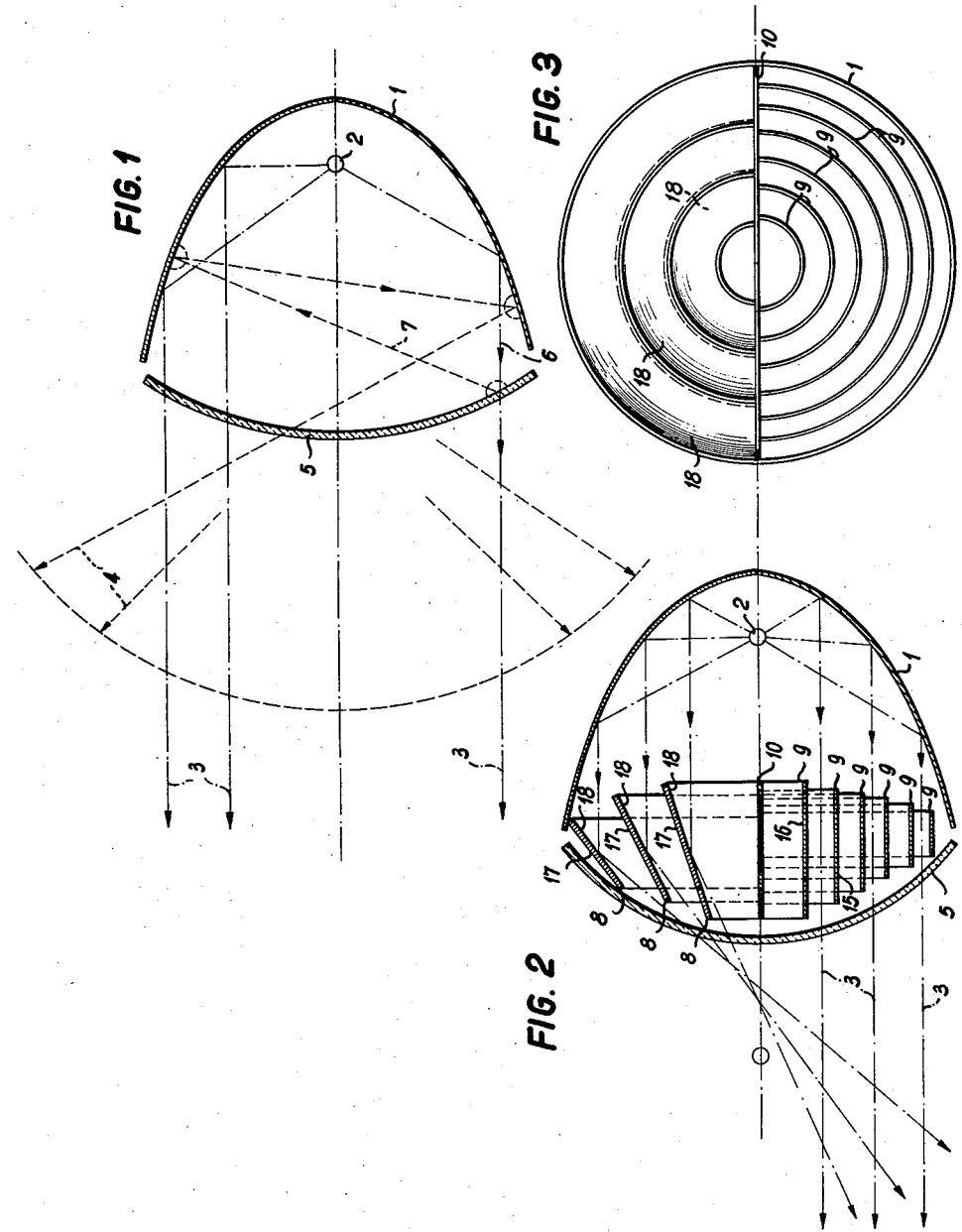
INVENTOR
J. Janhsen
By Bryant & Lowry
ATTYS April 8, 1958  J. JANHSEN  2,830,175
ANTI-DAZZLE ARRANGEMENT FOR HEADLIGHTS OF
MOTOR VEHICLES
Filed Jan. 11, 1956  2 Sheets-Sheet 2
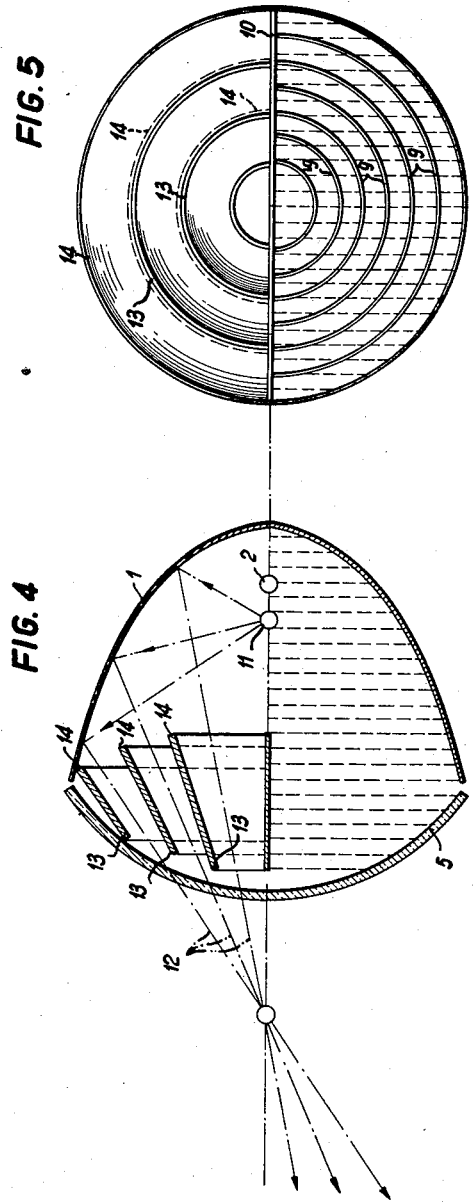
INVENTOR
J. Janhsen
By Bryant & Lowry
ATTYS.

United States Patent Office 2,830,175
Patented Apr. 8, 1958

2,830,175

ANTI-DAZZLE ARRANGEMENT FOR HEADLIGHTS OF MOTOR VEHICLES

Jakobus Janhsen, Hiddessen, near Detmold, Germany

Application January 11, 1956, Serial No. 558,483

Claims priority, application Germany January 14, 1955

2 Claims. (Cl. 240—46.41)

This invention relates to anti-dazzle arrangements, and more specifically to an anti-dazzle arrangement for such vehicle headlights which are equipped with two filament incandescent bulbs.

A large number of suggestions have already been made which are intended to prevent or at least reduce the dazzling effect of headlights of motor vehicles. Most of these suggestions consist of fittings which are introduced in the aperture through which the light of the headlight is projected. Thus, for example, it is known to employ plate strips which are intended to throw the light rays downwards on to the track. It has also been proposed to arrange such plate strips in the form of rings about the axis of the headlight so that the common axis of the ring-shaped plate strips is inclined to the axis of the headlight. Devices are likewise known in which the plate strips arranged in the outlet through which the light passes are in the shape of the walls of truncated cones.

All these known devices and arrangements are open to objections. Either they actually prevent approaching vehicles from being dazzled by the light of one's own headlights; but if they do, the screening and loss of light is invariably so strong that one's own headlights no longer illuminate the track sufficiently brightly. Or the track illumination is sufficient, but then again the dazzling effect is not avoided to a sufficient extent.

A careful investigation of the light effects occurring when vehicles meet shows that, in order to provide a vehicle headlight which meets all requirements, three conditions must be met simultaneously, viz. it must be seen that:

(1) One's own headlight does not dazzle the oncoming vehicle;

(2) One's own track is sufficiently lighted, in spite of dimming or dipping, and (3) One's own track is itself sufficiently lighted in spite of dipping when the approaching vehicle is not provided with anti-dazzle arrangement or whose headlights are wrongly adjusted or that vehicle is travelling with headlights full on, i. e., not dipped.

With the increase in traffic on the roads, the fact that the third condition, particularly, has not been taken into consideration in the known headlights and anti-dazzle arrangements has resulted in many accidents, because every driver knows that, when an approaching vehicle is travelling with undimmed or badly dimmed light, he steers into a dark hole at the moment the two vehicles meet so that particularly pedestrians and smaller vehicles at the same point are in very great danger.

The object of the present invention is to provide an anti-dazzle arrangement for headlights of motor vehicles which simultaneously complies with the above mentioned conditions. According to the present invention an anti-dazzle arrangement for headlights of motor vehicles, including plate strips concentrically surrounding the longitudinal axis of the beam in the form of laminae of cylindrical and truncated conical shape, is provided, wherein the plate strips in the lower portion of the beam projection aperture are half cylinder walls arranged concentrically to each other, the lines of which walls extend parallel to the full-light rays, whereas the plate strips in the upper part of the beam projection aperture are half truncated cone walls arranged concentrically to each other so that the wall lines extend parallel to the dim-light rays and are so wide that the radius of the shorter, front edge of each half truncated cone wall is smaller than the radius of the longer rear edge of the neighboring half truncated cone wall situated further inwards.

A preferred mebodiment of the invention is illustrated by way of example in the accompanying drawings, in which:

Fig. 1 is a diagram illustrating the problem to be solved;

Fig. 2 is a sectional view of a headlight equipped with the anti-dazzle arrangement according to the present invention;

Fig. 3 is a view of the anti-dazzle arrangement, seen from the side of the lamp, and Figs. 4 and 5 show the manner in which the anti-dazzle arrangement operates when the light is dimmed or dipped.

The solution of the problem is based on the knowledge illustrated diagrammatically in Fig. 1. This figure shows a reflector 1 and a glass 5 of a vehicle headlight having a focus point 2 in which the main or long distance beam incandescent filament of a two filament lamp is located. The long distance rays extending parallel to the axis of the headlight are designated by 3. The above mentioned knowledge consists in that it cannot be the long distance, straight ahead rays of an undimmed or undipped headlight, and certainly not the rays of a dipped headlight which cause the blinding or dazzling effect which increases until the two vehicles meet, because at the moment when the dazzling effect is greatest the approaching vehicle is already outside the space angle in which the reflected rays are projected directly from the reflector 1 of the headlight. One the other hand reflections between the headlight glass 5 and the reflector 1 are responsible for the dazzling rays designated by 4 in Fig. 1. Thus, for example, a beam designated by 6 is divided on the headlight glass 5 into a directly projected component, constituting the long distance rays 3, and a reflected component 7 the rays of which, after a number of further reflections, are thrown out laterally at a wide angle to the axis of the headlight. The combination of the rays thus reflected and thrown out laterally produces the dazzling effect for an approaching vehicle.

Recognizing this fact the problem on which the present invention is based is solved in principle in that the rays 4 producing the dazzling light are not only prevented from passing out laterally from the headlight but at the same time are utilized for improving the illumination of the stretch of the track directly in front of the vehicle. For this purpose an anti-dazzle arrangement is proposed for headlights of motor vehicles with two filament bulbs, in which plate strips concentrically surrounding the axis of the beam are provided in the form of cylindrical or truncated cone-shaped laminae. A characteristic of the anti-dazzle arrangement consists in that the plate strips in the lower portion of the beam projection aperture are mutually concentric, halved cylinder walls, the wall or generating lines of which extend parallel to the long-distance or straight ahead rays, whereas the plate strips in the upper portion of the beam projection aperture are mutually concentric, halved truncated cone walls, the wall lines of which extend parallel to the dim light rays, which are so wide that the radius of the shorter front edge of each half truncated cone wall is smaller than the radius of the longer rear edge of the neighboring half truncated cone wall towards the inner side. At the same time the half cylinder walls in the lower portion of the beam projection aperture are free from reflection inside and outside, whereas the half truncated cone walls in the upper portion of the beam projection aperture are free from reflection only on the outer side, whereas on the inner side they should be reflecting. A particularly favorable form of construction is an anti-dazzle arrangement of the type described, in which only a small number of half walls, preferably three or four, are provided.

The construction and manner of operation of the anti-dazzle arrangement according to the invention are hereinafter described by way of example with reference to Figs. 2 to 5 of the accompanying drawings.

The general construction of the arrangement is clearly shown in Fig. 2. As in Fig. 1 referred to above, the reflector is designated by 1, the focus point with the long-distance light incandescent filament by 2 and the headlight glass by 5. The anti-dazzle arrangement consists of half truncated cone walls 8 in the upper half and half cylinder walls 9 in the lower portion. The half truncated cone walls 8 and the half cylinder walls 9 are fixed on a central member 10 which preferably consists of a thin metal strip of a width that corresponds to the width of the walls 8, 9 carried thereby. The ends of the central member 10 may be connected to the inner wall of the reflector 1 in suitable manner, i. e., by soldering, riveting or the like. The individual truncated cone walls 8 are inclined in the manner shown in Fig. 4 so that they extend parallel to dim light rays 12 emanating from a dim-light filament 11 and reflected by the reflector 1. At the same time the individual truncated cone walls 8 are of such width that the radius of the shortest, front edge 13 of each half truncated cone wall 8 is smaller than the radius of the longer, rear edge 14 of the adjacent half truncated cone wall towards the inner side. In other words: seen from the side of the headlight, the front edge 13 of each half truncated cone wall 8 lies lower than the rear edge 14 of the neighboring half truncated cone wall further inwards. The outer surfaces 15 and the inner surfaces 16 of the half cylinder walls 9 are free from reflection, being provided for example with a suitable light-absorbing coat, in the same way as the outer surfaces 17 of the half truncated cone walls 8. The purpose of this is to prevent reflection between the headlight glass 5 and the said surfaces 15, 16 and 17. The inner surfaces 18 of the half truncated cone walls 8 are, on the other hand, reflecting surfaces, being provided, for example with a coating of nickel or chromium.

The anti-dazzle arrangement operates in the manner hereinafter described:

Fig. 2 shows the path of the rays in the case of full long-distance lighting. The rays emanating from the full-light incandescent filament 2 and reflected by the reflector 1 are allowed to pass unhindered in a direction parallel to the axis of the headlight only in the lower half of the beam projection aperture, because the half cylinder walls 9 are there parallel to the axis of the headlight. The full or long-distance rays 3 passing out from the lower half of the beam projection aperture fall on the stretch of track farther away from the vehicle. The rays emanating from the full-light incandescent filament 2, which when undimmed would also pass out parallel to the longitudinal axis of the headlight, are reflected by the reflecting inner surfaces 18 of the half truncated cone walls 8 so that they fall on the stretch of track directly in front of the vehicle. They therefore serve for intensively illuminating the track directly in front of the vehicle.

In the case of blended or dimmed light, the rays 19 from the dim light incandescent filament 11 and reflected by the reflector 1 pass unimpeded between the half truncated cone walls 8 on to the stretch of track located directly in front of the vehicle. The lower half of the beam projection aperture is without light in the manner customary with two filament lamps.

In both cases the side rays designated by 4 in Fig. 1 are prevented from passing out of the headlight in the direction there indicated. The reflections between the headlight glass 5 and the outer surfaces of the half cylinder walls 9 and the half truncated cone walls 8 are suppressed.

With the fitting hereinbefore described the light of the upper half of the headlight is brought below the longitudinal middle axis of the headlight. Consequently, not only a loss of light on the track is avoided but the light thrown thereon is considerably intensified.

From the above detailed description of the invention, it is believed that the construction will at once be apparent, and while there is herein shown and described a preferred embodiment of the invention, it is nevertheless to be understood that minor changes may be made therein without departing from the spirit and scope of the invention as claimed.

I claim:

1. In an anti-dazzle arrangement for vehicle headlights which include parabolic reflector means so shaped and a light producing means so positioned therein as to project a beam of parallel light rays uniformly therefrom; a plurality of plate strips positioned in front of said reflector and light producing means and concentrically surrounding the optical axis of said reflector, the plate strips in the lower portion of said reflector being half-cylinder walls, the planes of which extend parallel to the projected parallel light rays, the plate strips in the upper part of said reflector being half truncated cone walls, the radius of the shorter front edge of each of said half truncated cone walls being smaller than the radius of the longer rear edge of the neighboring half truncated cone wall situated further inwardly of the reflector, the inner faces of said half truncated cone walls being provided with a reflecting surface, all other faces of said concentric plate strips being provided with a non-reflecting surface.

2. In an anti-dazzle arrangement for vehicle headlights which include parabolic reflector means so shaped and a light producing means so positioned therein as to project a strong beam of parallel light rays uniformly therefrom, and an alternate light producing means positioned to project a weaker beam of converging light rays uniformly therefrom; a plurality of plate strips positioned in front of said reflector and light producing means and concentrically surrounding the optical axis of said reflector, the plate strips in the lower portion of said reflector being half cylinder walls, the planes of which extend parallel to the projected parallel light rays, the plate strips in the upper part of said reflector being half truncated cone walls, the planes of which are arranged to extend parallel to the converging light rays of said alternate light producing means, the radius of the shorter front edge of each of said half truncated cone walls being smaller than the radius of the longer rear edge of the neighboring half truncated cone wall situated further inwardly of the reflector, the inner faces of said half-truncated cone walls being provided with a reflecting surface, all other faces of said concentric plate strips being provided with a non-reflecting surface.

References Cited in the file of this patent

UNITED STATES PATENTS

| | | |
|---|---|---|
| 1,324,625 | Shaw | Dec. 9, 1919 |
| 1,621,224 | Scott | Mar. 15, 1927 |
| 1,863,547 | Arbuckle | June 14, 1932 |

FOREIGN PATENTS

| | | |
|---|---|---|
| 707,297 | France | July 6, 1931 |